(12) United States Patent
Urmson et al.

(10) Patent No.: US 11,727,523 B2
(45) Date of Patent: Aug. 15, 2023

(54) AUTONOMOUS VEHICLE SERVICES

(71) Applicant: Waymo LLC, Mountain View, CA (US)

(72) Inventors: Christopher Paul Urmson, Mountain View, CA (US); Peter Colijn, San Francisco, CA (US); Dmitri A. Dolgov, Los Altos, CA (US); Nathaniel Fairfield, Mountain View, CA (US); Salil Pandit, Palo Alto, CA (US); Nirmal Patel, Sunnyvale, CA (US); Ryan Powell, San Francisco, CA (US); Min Li Chan, San Francisco, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 17/528,595

(22) Filed: Nov. 17, 2021

(65) Prior Publication Data

US 2022/0138890 A1 May 5, 2022

Related U.S. Application Data

(63) Continuation of application No. 15/358,729, filed on Nov. 22, 2016, now Pat. No. 11,205,240.
(Continued)

(51) Int. Cl.
*G06Q 50/30* (2012.01)
*G06Q 10/0631* (2023.01)
(Continued)

(52) U.S. Cl.
CPC ......... *G06Q 50/30* (2013.01); *G01C 21/3617* (2013.01); *G05D 1/00* (2013.01);
(Continued)

(58) Field of Classification Search
CPC combination set(s) only.
See application file for complete search history.

(56) References Cited

U.S. PATENT DOCUMENTS

| 8,352,112 B2 | 1/2013 | Mudalige |
| 8,630,897 B1 | 1/2014 | Prada Gomez et al. |

(Continued)

FOREIGN PATENT DOCUMENTS

| CN | 103034907 A | 4/2013 |
| CN | 103679316 A | 3/2014 |

(Continued)

OTHER PUBLICATIONS

E. C. . -H. Ngai, S. Brandauer, A. Shrestha and K. Vandikas, "Personalized mobile-assisted smart transportation," 2016 Digital Media Industry & Academic Forum (DMIAF), 2016, pp. 158-160, doi: 10.1109/DMIAF.2016.7574923. (Year: 2016).*

(Continued)

*Primary Examiner* — Crystol Stewart
(74) *Attorney, Agent, or Firm* — Botos Churchill IP Law LLP

(57) ABSTRACT

The technology relates to facilitating transportation services between a user and a vehicle having an autonomous driving mode. For instance, one or more server computing devices having one or more processors may information identifying the current location of the vehicle. The one or more server computing devices may determine that the user is likely to want to take a trip to a particular destination based on prior location history for the user. The one or more server computing devices may dispatch the vehicle to cause the vehicle to travel in the autonomous driving mode towards a location of the user. In addition, after dispatching, the one or more server computing devices sending a notification to a client computing device associated with the user indicating that the (Continued)

vehicle is currently available to take the passenger to the particular destination.

19 Claims, 12 Drawing Sheets

Related U.S. Application Data

(60) Provisional application No. 62/273,067, filed on Dec. 30, 2015.

(51) Int. Cl.

| | | |
|---|---|---|
| *G05D 1/00* | (2006.01) | |
| *G08G 1/123* | (2006.01) | |
| *G01C 21/36* | (2006.01) | |
| *G08G 1/00* | (2006.01) | |
| *G01C 21/34* | (2006.01) | |
| *B60W 60/00* | (2020.01) | |
| *G08G 1/005* | (2006.01) | |

(52) U.S. Cl.
CPC .............. *G06Q 10/06315* (2013.01); *G06Q 10/063114* (2013.01); *G08G 1/005* (2013.01); *G08G 1/123* (2013.01); *G08G 1/202* (2013.01); *B60K 2370/175* (2019.05); *B60W 60/00253* (2020.02); *G01C 21/343* (2013.01)

(56) References Cited

U.S. PATENT DOCUMENTS

| | | | |
|---|---|---|---|
| 8,880,270 | B1 | 11/2014 | Ferguson et al. |
| 9,008,890 | B1 | 4/2015 | Herbach et al. |
| 9,377,315 | B2 | 6/2016 | Grover et al. |
| 9,568,331 | B1 | 2/2017 | Narang et al. |
| 9,599,477 | B1 | 3/2017 | Aula et al. |
| 9,606,539 | B1* | 3/2017 | Kentley ............... G05D 1/0088 |
| 9,658,620 | B1 | 5/2017 | Urmson et al. |
| 9,910,438 | B1 | 3/2018 | Arden et al. |
| 9,984,574 | B2 | 5/2018 | Laetz |
| 10,409,289 | B2 | 9/2019 | Zhang |
| 10,692,028 | B2 | 6/2020 | Liu et al. |
| 10,984,498 | B2 | 4/2021 | Bryant et al. |
| 2003/0193413 | A1* | 10/2003 | Jones .................. G06Q 10/08 340/994 |
| 2003/0195696 | A1 | 10/2003 | Jones |
| 2005/0021225 | A1 | 1/2005 | Kantarjiev et al. |
| 2005/0125148 | A1 | 6/2005 | Van et al. |
| 2007/0010942 | A1 | 1/2007 | Bill |
| 2008/0027639 | A1 | 1/2008 | Tryon |
| 2008/0195428 | A1 | 8/2008 | O'Sullivan |
| 2011/0301985 | A1 | 12/2011 | Camp et al. |
| 2012/0173136 | A1 | 7/2012 | Ghoting et al. |
| 2012/0239452 | A1 | 9/2012 | Trivedi et al. |
| 2012/0290652 | A1 | 11/2012 | Boskovic |
| 2013/0166096 | A1 | 6/2013 | Jotanovic |
| 2013/0194406 | A1 | 8/2013 | Liu et al. |
| 2013/0297551 | A1* | 11/2013 | Smith .................. H04L 51/222 706/48 |
| 2014/0005848 | A1 | 1/2014 | Melen |
| 2014/0142834 | A1 | 5/2014 | Maitra et al. |
| 2014/0180575 | A1* | 6/2014 | Lin ..................... G08G 1/123 701/465 |
| 2014/0343841 | A1 | 11/2014 | Faaborg et al. |
| 2015/0045068 | A1 | 2/2015 | Soffer et al. |
| 2015/0219464 | A1 | 8/2015 | Beaurepaire et al. |
| 2015/0233719 | A1 | 8/2015 | Cudak et al. |
| 2015/0248651 | A1 | 9/2015 | Akutagawa et al. |
| 2015/0262430 | A1 | 9/2015 | Farrelly et al. |
| 2015/0262435 | A1 | 9/2015 | Delong et al. |
| 2015/0292893 | A1 | 10/2015 | Bartsch et al. |
| 2015/0324708 | A1 | 11/2015 | Skipp et al. |
| 2015/0339928 | A1 | 11/2015 | Ramanujam |
| 2015/0345970 | A1 | 12/2015 | Tanaka et al. |
| 2015/0354978 | A1 | 12/2015 | Gerlach |
| 2016/0048777 | A1 | 2/2016 | Kitagawa et al. |
| 2016/0148167 | A1 | 5/2016 | Li |
| 2016/0167648 | A1* | 6/2016 | James ................... B60Q 1/503 701/28 |
| 2016/0203586 | A1 | 7/2016 | Chang et al. |
| 2016/0209220 | A1 | 7/2016 | Laetz |
| 2016/0307443 | A1 | 10/2016 | Chu et al. |
| 2016/0334797 | A1 | 11/2016 | Ross et al. |
| 2016/0370194 | A1 | 12/2016 | Colijn et al. |
| 2017/0075358 | A1 | 3/2017 | Zhang |
| 2017/0091891 | A1 | 3/2017 | Van Der Berg |
| 2017/0098377 | A1 | 4/2017 | Marco et al. |
| 2017/0147959 | A1 | 5/2017 | Sweeney et al. |
| 2017/0184411 | A1 | 6/2017 | Glasgow et al. |
| 2017/0186126 | A1* | 6/2017 | Marco ................... G06Q 50/30 |
| 2018/0326997 | A1 | 11/2018 | Sweeney et al. |

FOREIGN PATENT DOCUMENTS

| | | |
|---|---|---|
| CN | 104077915 A | 10/2014 |
| CN | 104794885 A | 7/2015 |
| CN | 104885110 A | 9/2015 |
| CN | 105069736 A | 11/2015 |
| CN | 105094767 A | 11/2015 |
| CN | 105096079 A | 11/2015 |
| JP | 2002056078 A | 2/2002 |
| JP | 2002208092 A | 7/2002 |
| JP | 2004030265 A | 1/2004 |
| JP | 2005044272 A | 2/2005 |
| JP | 2005250614 A | 9/2005 |
| JP | 2009244032 A | 10/2009 |
| JP | 2010092414 A | 4/2010 |
| JP | 2010134762 A | 6/2010 |
| JP | 2012053790 A | 3/2012 |
| JP | 2012088925 A | 5/2012 |
| JP | 2015138324 A | 7/2015 |
| KR | 20130035960 A | 4/2013 |
| WO | 2014099858 A2 | 6/2014 |
| WO | 2015151862 A1 | 10/2015 |

OTHER PUBLICATIONS

Shimohira et al., Commericial Vehicle Application System, Feb. 2, 2021, China National Intellectual Property Administration, CN 112313724 A. Machine Translation (Year: 2021).*
S. Zhang and K. Zhang, "Dynamic Ridesharing Strategy for Shared Autonomous Vehicles Based on Maximum Similarity of Trajectories," 2020 IEEE 7th International Conference on Industrial Engineering and Applications (ICIEA), Bangkok, Thailand, 2020, pp. 766-769, doi: 10.1109/ICIEA49774.2020.9101910. (Year: 2020).*
Australian Examination Report No. 2 for Application No. 2016381437 dated Feb. 7, 2020.
Canadian Examiner's Report for Application No. 3010272 dated Apr. 2, 2020.
Decision to Grant JP Application No. 2018533154 dated 122 Jan. 2021 With English Translation.
Examination Report No. 3 in Australian Application No. 2016381437, dated Apr. 21, 2020 4 pages.
First Office Action in CN Application No. 2016800766018.8 dated Jan. 26, 2021 with English Translation.
Korean Notice of Final Rejection for Application No. 10-2018-7018159 dated Jan. 6, 2020.
Ngai et al., "Personalized mobile-assisted smart transportation," 2016 Digital Media Industry & Academic Forum (DM TAF), 2016, pp. 158-160, doi: 10.1109/DMIAF.2016.7574923 (Year: 2016).
Office Action in Japanese Patent Application No. 2018-533154, dated Jun. 1, 2020 (with English Translation) 12 pages.
Republic of Korea's Notice of Preliminary Rejection for Application No. 10-2018-7018159 dated Feb. 21, 2020.
Second Office Action in CN Application No. 2016800766018.8 dated Jul. 1, 2021.
"Canadian Office Action for Application No. 3,010,272 dated Apr. 5, 2019", 3 pages.

(56) References Cited

OTHER PUBLICATIONS

"European Communication issued in application serial No. EP 16882489.4 dated May 3, 2019", 8 pages.
"International Preliminary Report on Patentability for PCT Application No. PCT/US2016/068650, dated Jul. 12, 2018", 9 pages.
"International Search Report and Written Opinion for PCT Application No. PCT/US2016/068650, dated Mar. 17, 2017", 12 pages.
"Japanese Office Action for Application No. 2018-533154 dated Oct. 2, 2019", 13 pages (7 pages of English Translation and 6 pages of Official copy).
"Korean Office Action for Application No. 10-2018-7018159 dated Apr. 18, 2019", 14 pages (6 pages of English Translation and 8 pages of Official copy).
"Singapore Office Action for Application No. 11201804943V dated Jun. 27, 2019", 11 pages.
ADVERTISINGAGE, "How Sensor-Enabled Ads Will Change Mobile Advertising", Retrieved from Internet <http://adage.com/article/adtile/sensor-enabled-ads-change-mobile-advertising/298620/>, 2015, 5 pages.
Business Insider, "From Start to Finish, This Is How Beacons Send Ads to Your Phone While You're Shopping", Retrieved from Internet <http://www.businessinsider.com/how-beacon-ad-campaigns-work-2014-12>, 2014, 1 page.
Business Wire, "Smart Cars Meet Smart Homes: Ford Exploring SYNC Integration with Amazon Echo and Alexa, Wink", Retrieved from Internet <http://www.businesswire.com/news/home/20160104006562/en/Smart-Cars-Meet-Smart-Homes-Ford-Exploring>, 2016, 3 pages.
Gigaom, "Waze Begins Monetization Push With Location-Guided Ads", Retrieved from Internet <https://gigaom.com/2012/11/07/waze-begins-monetization-push-with-location-guided-ads/>, 2012, 5 pages.
Gigaom, "Waze Navigates Users To Exclusive Discounts on Gas", Retrieved from Internet <https://gigaom.com/2012/06/20/waze-navigates-users-to-exclusive-discounts-on-gas/>, 2012, 2 pages.
Holguin-Veras, et al., "Off-Peak Freight Deliveries: Challenges and Stakeholders Perceptions", Transportation Research Record, 2005, 20 pages.
Itunes, "Taxilater Scheduled Rides for Uber on the App Store", Retrieved from Internet <https://itunes.apple.com/us/app/taxilater-scheduled-rides/id999590241>, 2016, 3 pages.
Ma, L.V., et al., "Automated Taxi Booking Operations for Autonomous Vehicles," 2019 13th International Conference on Signal Processing and Communication Systems (ICSPCS), 2019, pp. 1-5, doi: 10.1109/ICSPCS47537.2019.9008449. (Year: 2019).
Macgurl, "The Weekly App Review: #1 Waze", Retrieved from Internet <http://www.macgurl.net/2013/03/05/the-weekly-app-review-1-waz/>, 2013, 4 pages.
Maxbotix, "Kiosk Sensors for Digital & Interactive Advertising & Self-Service Solutions", Retrieved from Internet <http://www.maxbotix.com/applications/interactive-kiosks.htm>, 2016, 2 pages.
Pluntke, et al., "INSINC: A Platform for Managing Peak Demand in Public Transit", Sustainable Urban Transport, 2013, 9 pages.
Saini, et al., "Scheduling Automatic Pickup by Self-driving Cars", Retrieved from Internet <http://www.tdcommons.org/cgi/viewcontenl.cgi?article=1173&context=dpubs_series>, 2016, 7 pages.
Techcrunch, "Looking to Monetize Its Maps, Waze Launches a Location-Aware Mobile Ad Platform for Local Businesses", Retrieved from Internet <https://techcrunch.com/2012/11/07/looking-to-monetize-its-maps-waze-launches-a-location-aware-mobile-ad-platform-for-local-businesses/>, 2012, 8 pages.
The Verge, "Snapchat Applies for Patent to Serve Ads by Recognizing Objects in Your Snaps", Retrieved from Internet <http://www.theverge.eom/2016/7/18/12211292/snapchat-object-recognition-advertising>, 2016, 11 pages.
Ubergizmo, "Waze Planned Drives on iOS Makes Navigation Even Easier", Retrieved from Internet <http://www.ubergizmo.com/2016/03/waze-planned-drives-on-ios-makes-navigation-even-easier/>, 2016, 2 pages.
Venturebeat, "Lyft Slashes Ridesharing Prices During Slower Hours, Claims to be the Most 'Affordable Option", Retrieved from Internet <http://venturebeat.com/2014/03/18/lyft-slashes-prices-ridesharing-prices-during-slower-hours-claims-to-be-the-most-affordable-option/>, 2014, 4 pages.
Waze, "Gas Station Coupons", Retrieved from Internet <https://www.waze.com/forum/viewtopic.php?f=3&t=20689>, 2010-2012, 7 pages.
Zhu, et al., "Reducing Road Congestion Through Incentives: A Case Study", 2015, 15 pages.

\* cited by examiner

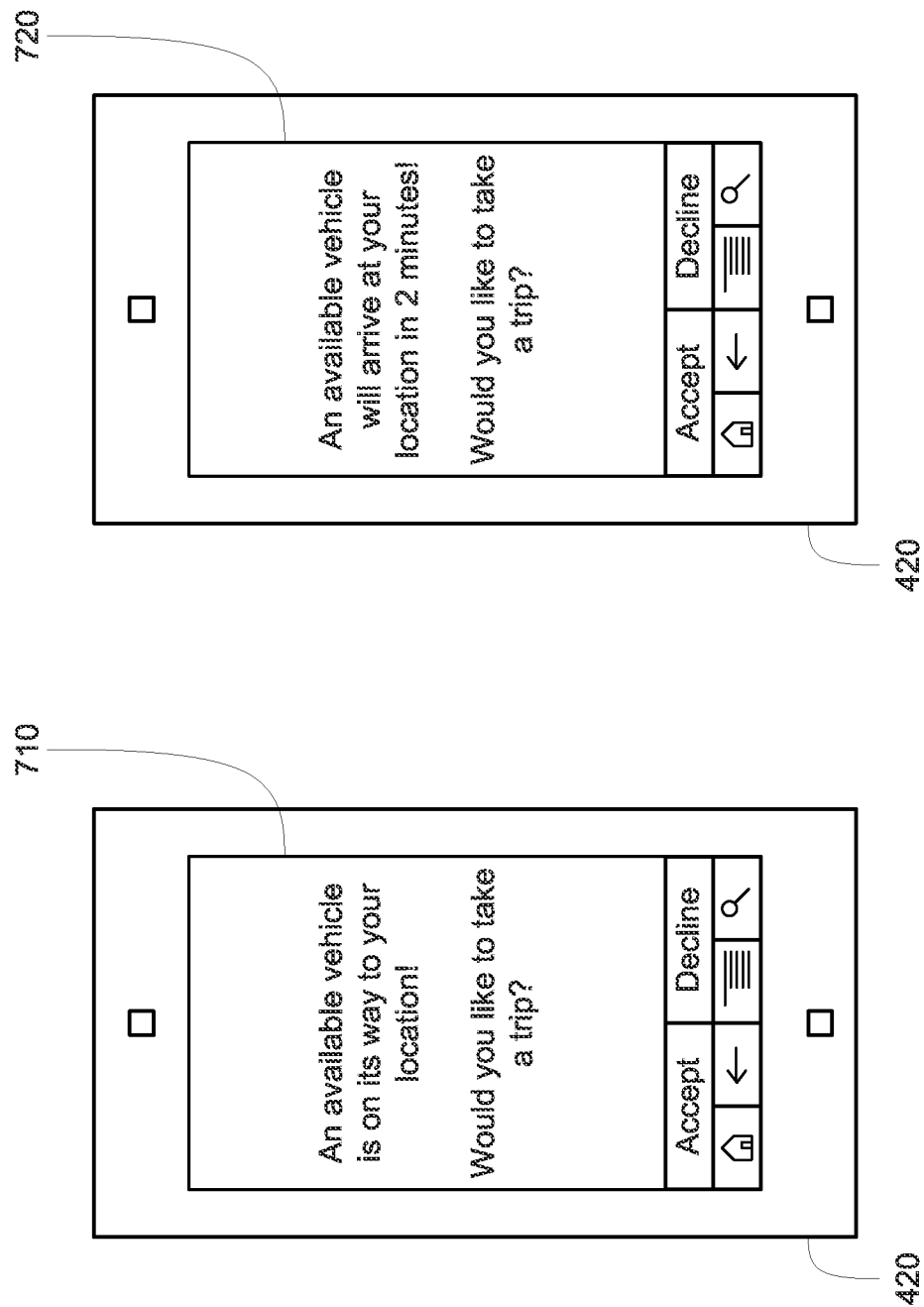

AUTONOMOUS VEHICLE SERVICES

CROSS-REFERENCES TO RELATED APPLICATIONS

The present application is a continuation of U.S. patent application Ser. No. 15/358,729, filed Nov. 22, 2016, which claims the benefit of the filing date of U.S. Provisional Application No. 62/273,067, filed Dec. 30, 2015, entitled AUTONOMOUS VEHICLE SERVICES, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

BRIEF SUMMARY

Aspects of the disclosure provide a method for facilitating transportation services between a user and a vehicle having an autonomous driving mode. The method includes receiving, by one or more server computing devices having one or more processors, information identifying a current location of the vehicle; determining, by the one or more server computing devices, that the user is likely to want to take a trip to a particular destination based on prior location history for the user; dispatching, by the one or more server computing devices, the vehicle to cause the vehicle to travel in the autonomous driving mode towards a location of the user; and after dispatching, by the one or more server computing devices, sending a notification to a client computing device associated with the user indicating that the vehicle is currently available to take the user to the particular destination.

In one example, the method also includes, prior to determining that the user is likely to want to take a trip, identifying the vehicle as available to transport a passenger. In another example, the method also includes, prior to determining that the user is likely to want to take a trip, identifying the vehicle will become available to transport a passenger within a predetermined expected period of time. In another example, the method also includes receiving information identifying a current location of the client computing device, and determining that the user is likely to want to take a trip is further based on the current location of the client computing device. In this example, the current location of the client computing device is the location of the user, and the notification further indicates that the vehicle is currently at the current location of the client computing device. In another example, the method also includes receiving, by the one or more server computing devices, information identifying a current location of the client computing device, prior to determining that the user is likely to want to take a trip, identifying a set of users within a predetermined distance of the current location of the vehicle, and determining that the user is likely to want to take a trip, includes selecting the user from the set of users based on the prior location history for the user. In another example, the method also includes receiving, by the one or more server computing devices, the prior location history of the user; generating, by the one or more server computing devices, one or more task metrics for the user based on the prior location history, the one or more task metrics each define a location to which the user is likely to need to travel, and determining that the user is likely to want to take a trip is further based on the one or more task metrics. In this example, the one or more task metrics includes a task metric indicating that the user is likely to need to travel to the particular destination.

In another example, dispatching includes instructing the vehicle to wait for further instructions. In another example, the method also includes receiving calendar information for the user, wherein determining that the user is likely to want to take a trip is further based on a calendar entry of the calendar information. In this example, the method also includes generating, by the one or more server computing devices, one or more task metrics for the user based on the calendar entry, the one or more task metrics each define a location to which the user is likely to need to travel, and determining that the user is likely to want to take a trip is further based on the one or more task metrics.

In another example, the method also includes receiving, by the one or more computing devices, from the client computing device information indicating acceptance of a trip in response to the notification, and in response to receiving the information indicating acceptance of a trip, sending, by the one or more computing devices, updated dispatching instructions to the vehicle. In this example, the updated dispatching instructions include information identifying the user's client computing device to allow the vehicle to authenticate the user. In addition, the method also includes receiving, by the one or more server computing devices, information identifying a current location of the client computing device, and the notification further indicates that the vehicle is currently traveling towards the current location of the client computing device and an estimated time of arrival of the vehicle for the current location of the client computing device; determining that the vehicle will not reach the current location of the client computing device within the estimated time of arrival; and based on the determination that the vehicle will not reach the current location of the client computing device within the estimated time of arrival, generating a second notification including an offer to occupy the user until the vehicle is able to pick up the user. In addition, the offer suggests that the user wait at a particular location until the vehicle is available. In addition, the notification further indicates an estimated time of arrival of the vehicle at the current location of the client computing device.

In another example, the method also includes receiving, by the one or more server computing devices, information identifying a current location of the client computing device, and the notification further indicates that the vehicle is currently at the current location of the client computing device. In another example, the method also includes receiving location information identifying current locations of a plurality of client computing devices each associated with a different user, and sending the notification to each of the plurality of client computing devices, wherein the notification indicates that multiple seats are available to users for a trip to the particular destination. In addition, the method also includes receiving, in response to sending the notification to the plurality of client computing devices, information indicating acceptance of a trip for each of the multiple seats from a first portion of the plurality of client computing devices, and after receiving the information indicating acceptance of a trip, sending to a second portion of the plurality of client computing devices a notification that the multiple seats are no longer available.

Another aspect of the disclosure provides a system including one or more server computing devices having one or more processors. The one or more processors are further configured to receive information identifying a current location of the vehicle; determine that the user is likely to want to take a trip to a particular destination based on prior location history for the user; dispatch vehicle to cause the vehicle to travel in the autonomous driving mode towards a location of the user; and after dispatching, send a notification to a client computing device associated with the user indicating that the vehicle is currently available to take the user to the particular destination.

BRIEF DESCRIPTION OF THE DRAWINGS

FIGS. 7A-7D are examples of client computing devices displaying notifications in accordance with aspects of the disclosure.

DETAILED DESCRIPTION

Overview

Figure 1:
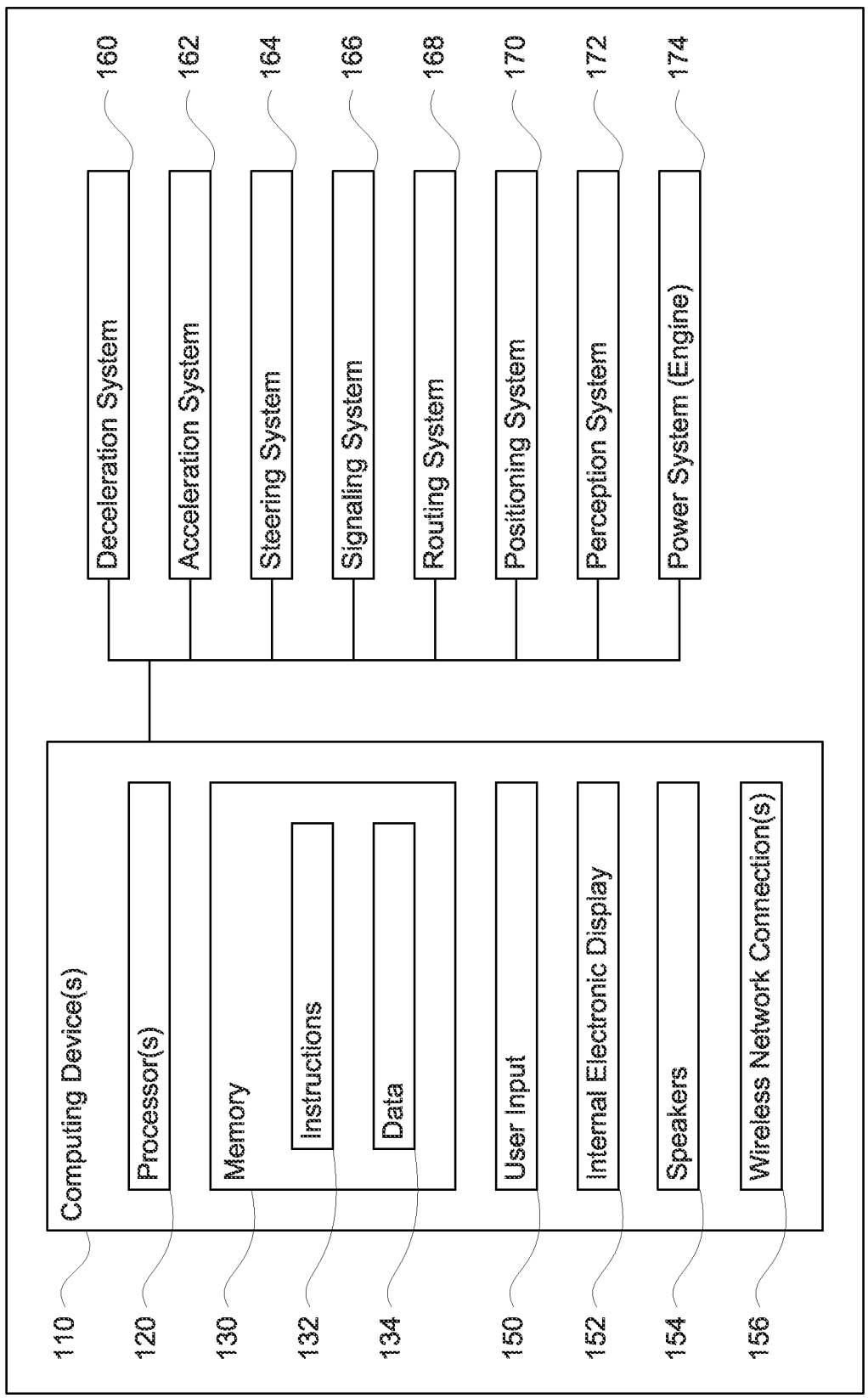
FIG. 1 is a functional diagram of an example vehicle in accordance with aspects of the disclosure.

The technology relates to vehicle transportation services involving fleets of vehicles for maneuvering passengers and/or cargo to a destination autonomously. Such services may involve a user downloading an application to a device and using the application to request a vehicle. The request is sent to a server device which dispatches a vehicle to pick up the user and transport him or her to a destination. However, once the user has downloaded the application, the application can be used to encourage users to use the service based on the current location of available vehicles as well as the user's ride history and other information provided by the user to the server.

For example, the user may opt to share certain information about the user with the application, such as his or her work or social schedule, access to personal email accounts or calendars, and/or real time location information. This information may be sent to the server for processing. In addition, the server may store information about a user's ride history. This ride history may include pick up and drop off locations, time of day, day of the week etc.

By processing the aforementioned ride history information, the server may identify patterns of ride behavior. For instance, these patterns may include where the user is typically picked up and dropped off and when. This may include, for example, information about when and how users use the services.

In addition, the server may process the shared user information in order to generate task metrics for the user. Task metrics may define tasks that the user is likely to perform or locations to which the user will or has gone. For instance, a calendar entry regarding a restaurant or an email confirming a restaurant reservation may be used to generate a task metric indicating that the user is likely to perform the task of going to that restaurant at the time specified in the calendar entry or email confirmation. In yet another example, a task metric may identify a location to which the user frequently travels, such as the location of the user's workplace, favorite restaurant or coffee shop, etc. In such examples, the task metric may identify the location and a time or range of times when the user typically has gone to the location.

The task metrics and current location information for users may be used to identify users who are likely to use the service for a trip. In addition to information about users, the server computing devices may have real time information about the location and status of vehicles within the fleet of vehicles. For instance, many vehicles may be located in a given area, but only some of those vehicles may be empty and not already dispatched or otherwise assigned to pick up a particular user.

By combining the locations of vehicles with the locations of users and the users' task metrics, the server computing devices can determine whether there is a vehicle currently located within a predetermined distance of a user who is likely to need or want to take a ride or rather is associated with a task metric which indicates that the user is likely to want to take a trip in the near future. Thus, to identify a specific vehicle and user combination, the server computing device may first identify any currently available vehicles or vehicles that are going to become available in the near future.

Then, using the location information shared by users, server computing devices may then identify a set of any users within a predetermined distance of an available vehicle. Of the identified set of users, the server computing devices may then select one or more of those that are associated with task metrics that indicate that these users are likely to accept a trip in response to a notification.

A notification may then be generated for the identified one or more users indicating that a vehicle is available for a trip. However, prior to sending a notification, the server computing devices can first send an instruction to dispatch the identified available vehicle to the location of the user or to continue to wait at its current location, for instance, if the vehicle is parked at a location proximate of the user's current location. In this way, the notification is provided only when the vehicle is on its way to the location of the user or has already reached the location of the user. For instance, once the server computing devices has identified a user and a vehicle, without receiving a specific request for the vehicle, the vehicle may show up at or near a particular user's current location. In this way, the notification itself can inform the user that a vehicle is on the way or at the location of the user.

Once a user and vehicle are identified, the server computing devices can send a notification to the user's device for display to the user. As noted above, the server computing devices computing devices may generate a notification to be provided to the user to indicate that a vehicle is currently available for a trip. After dispatching the vehicle or instructing the vehicle to wait at its current location, the notification may be sent to the user. Once received by the user's client computing device, an audible tone or tactile indication may be provide to indicate that a notification has been received. The user may then select to view or hear the notification.

In addition to indicating that the vehicle is available to pick up the user for a ride, the notification may also make a suggestion about a destination. This suggestion may be generated based on the user's pattern of ride behavior or any task metric or metrics used to identify the user.

The timing of the notification may be based on the location of the user, how long it will take to reach the suggested location, any date and/or time of any task metric used to identify the user, how long it will take an available identified vehicle to reach the user, etc. In addition, the server computing devices may even provide the user's client device with instructions to provide and/or display the notification at that or some other particular time.

A user may accept the notification, or rather the offer for a ride in the notification. The acceptance may be provided to the server computing device. At that point, the server computing device may provide the user's client computing device with further information regarding the current location of the vehicle and whether it is stopped and already waiting for the user. All or some of this information may be displayed and or played to the user (if an audible message) based upon the user's notification preferences.

At the same time, the server computing devices may send the identified vehicle updated dispatch information. For instance, this may include information identifying the user, for instance to facilitate authentication of the user's client computing device prior to the trip, and/or final dispatch instructions to allow the vehicle to actually reach an updated location of the user. As the vehicle approaches the user's client device (or vice versa), the vehicle's computing devices may authenticate the user's client device and also the user.

When the user is authenticated, the vehicle's computing devices may automatically unlock the vehicle's doors and allow the user to enter the vehicle. Thereafter the vehicle's computing devices may initiate the necessary systems to control the vehicle autonomously along a route to the destination location.

The features described herein may be used to encourage users to use vehicle transportation services. By moving vehicles to the location of a user prior to sending a notification, this not only reduces the amount of waiting time for the user if they respond positively to the notification but also increases the likelihood that the user will actually take the ride. Moreover, as noted above, by moving vehicles to locations and suggesting destinations to encourage rides for available vehicles, this can reduce downtime for vehicles between trips and help bring the vehicle to a location where it will need to be making the entire service more efficiently run.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (for instance, a gas or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 134 may store detailed map information, e.g., highly detailed maps identifying the shape and elevation of roadways, lane lines, lanes and heading information (identifying the headings or orientations of the lanes), intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

Figure 2A:
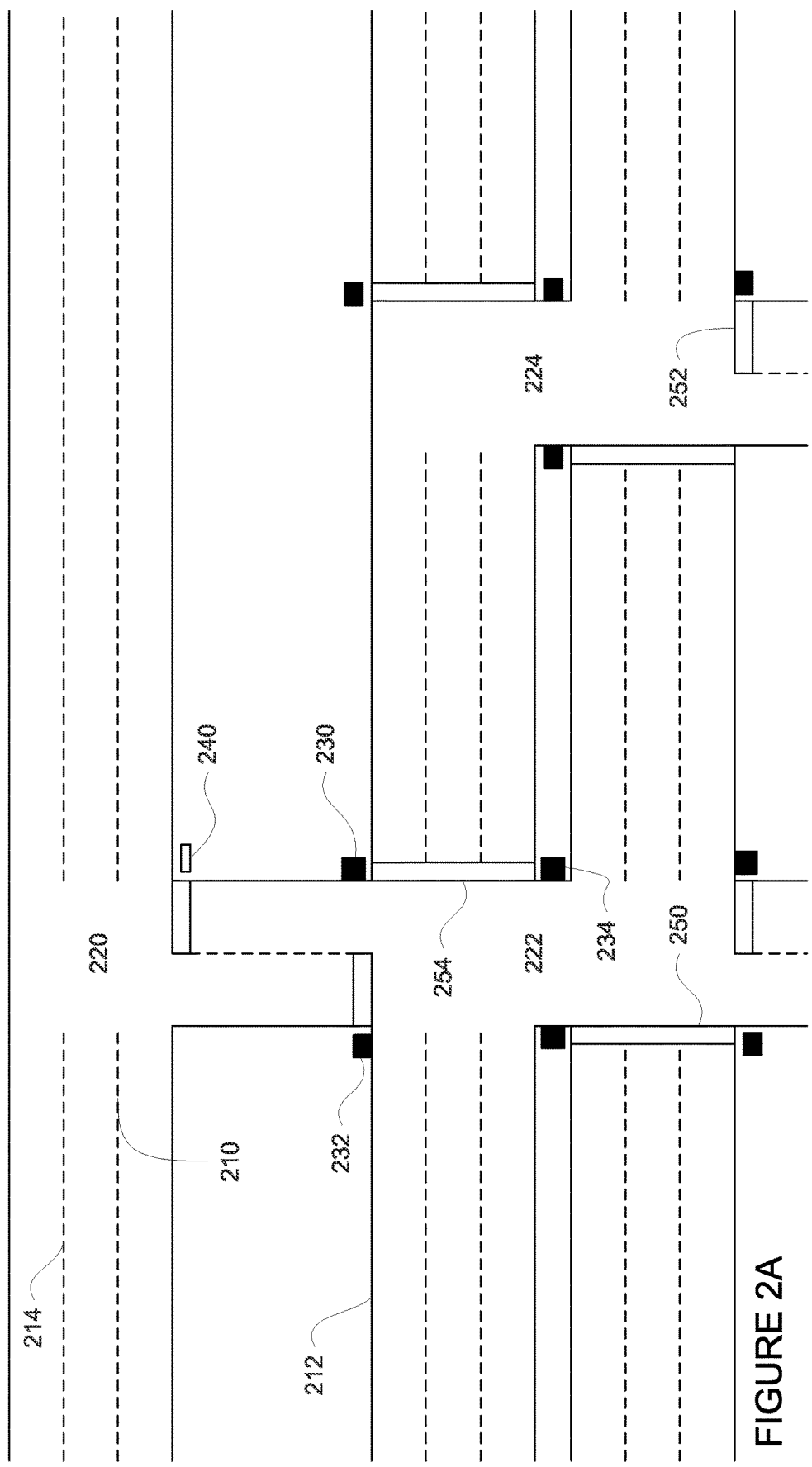
FIGS. 2A-2B are diagrams of map information in accordance with aspects of the disclosure.
Figure 2B:
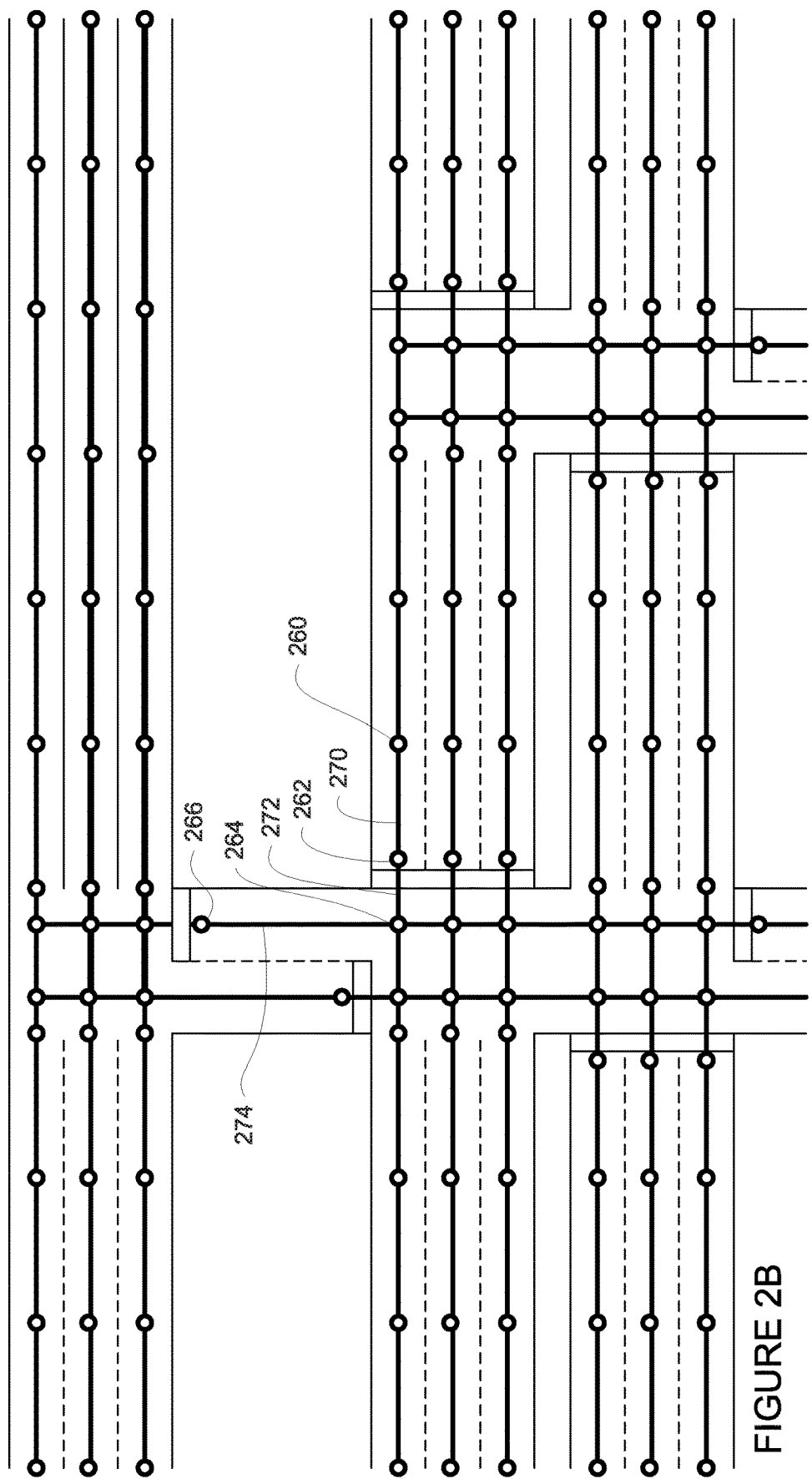
Figure 3A:
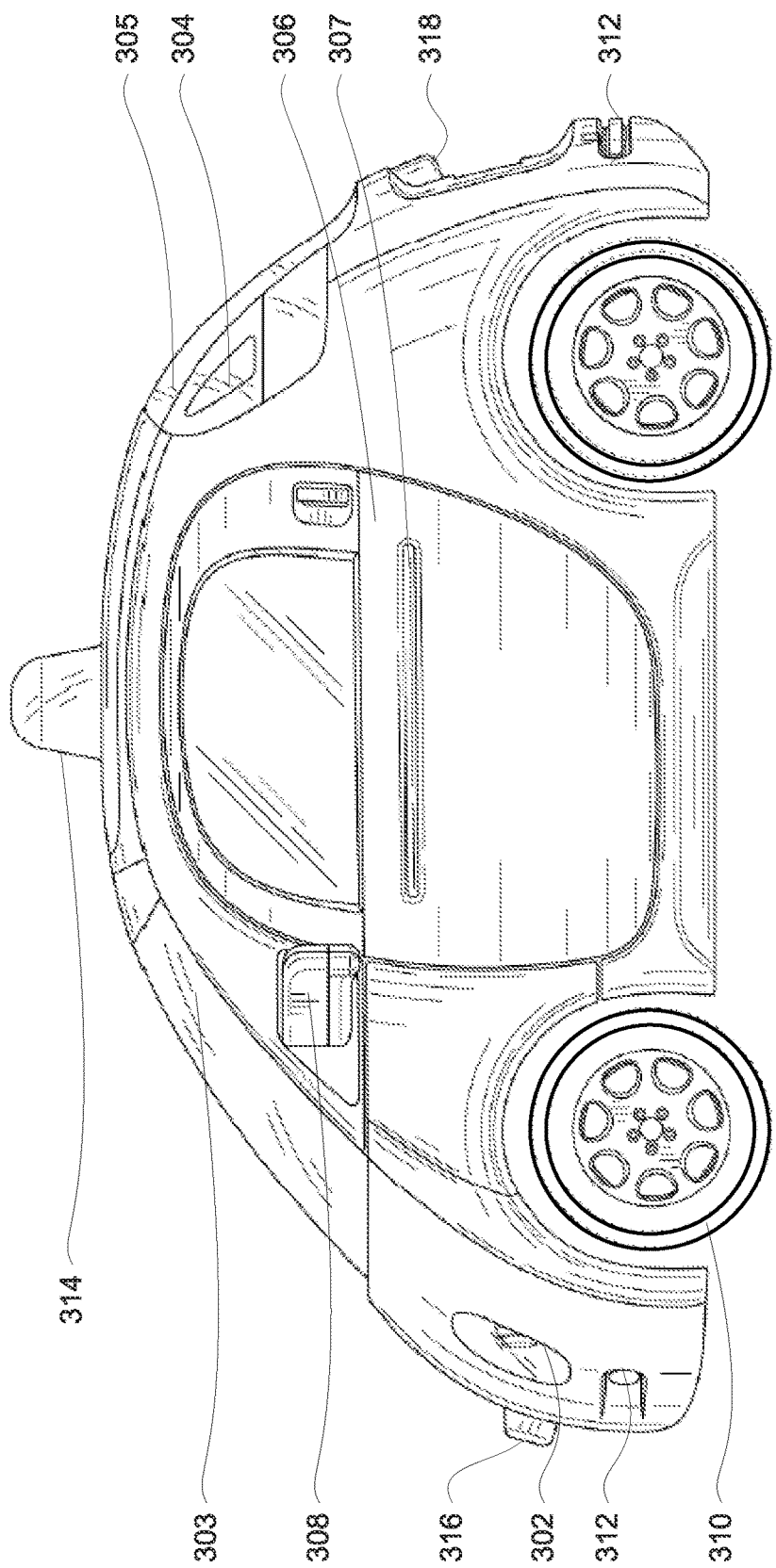
FIGS. 3A-3D are example external views of a vehicle in accordance with aspects of the disclosure.
Figure 3C:
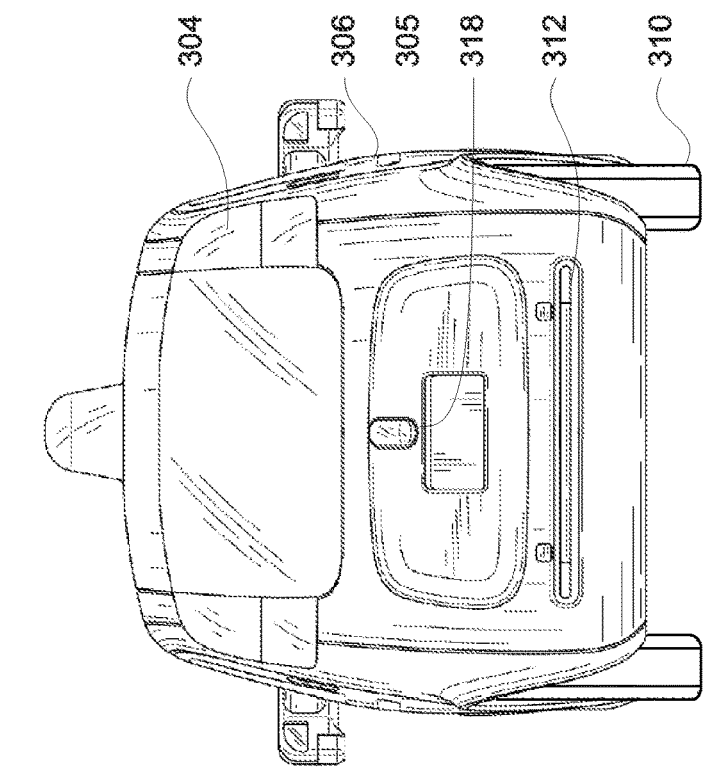
Figure 3B:
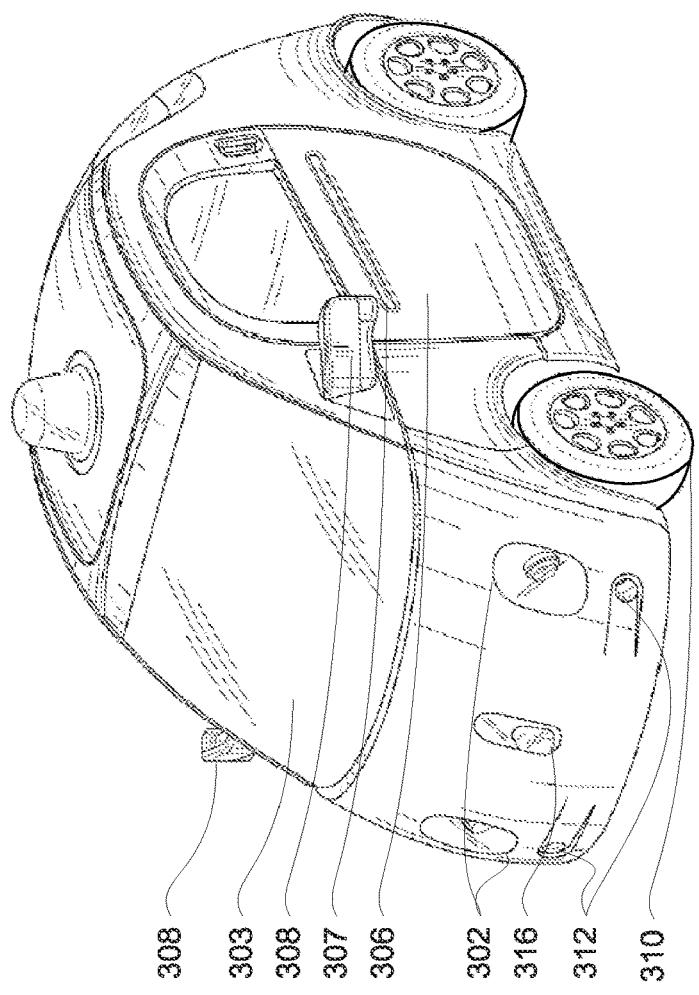
Figure 3D:
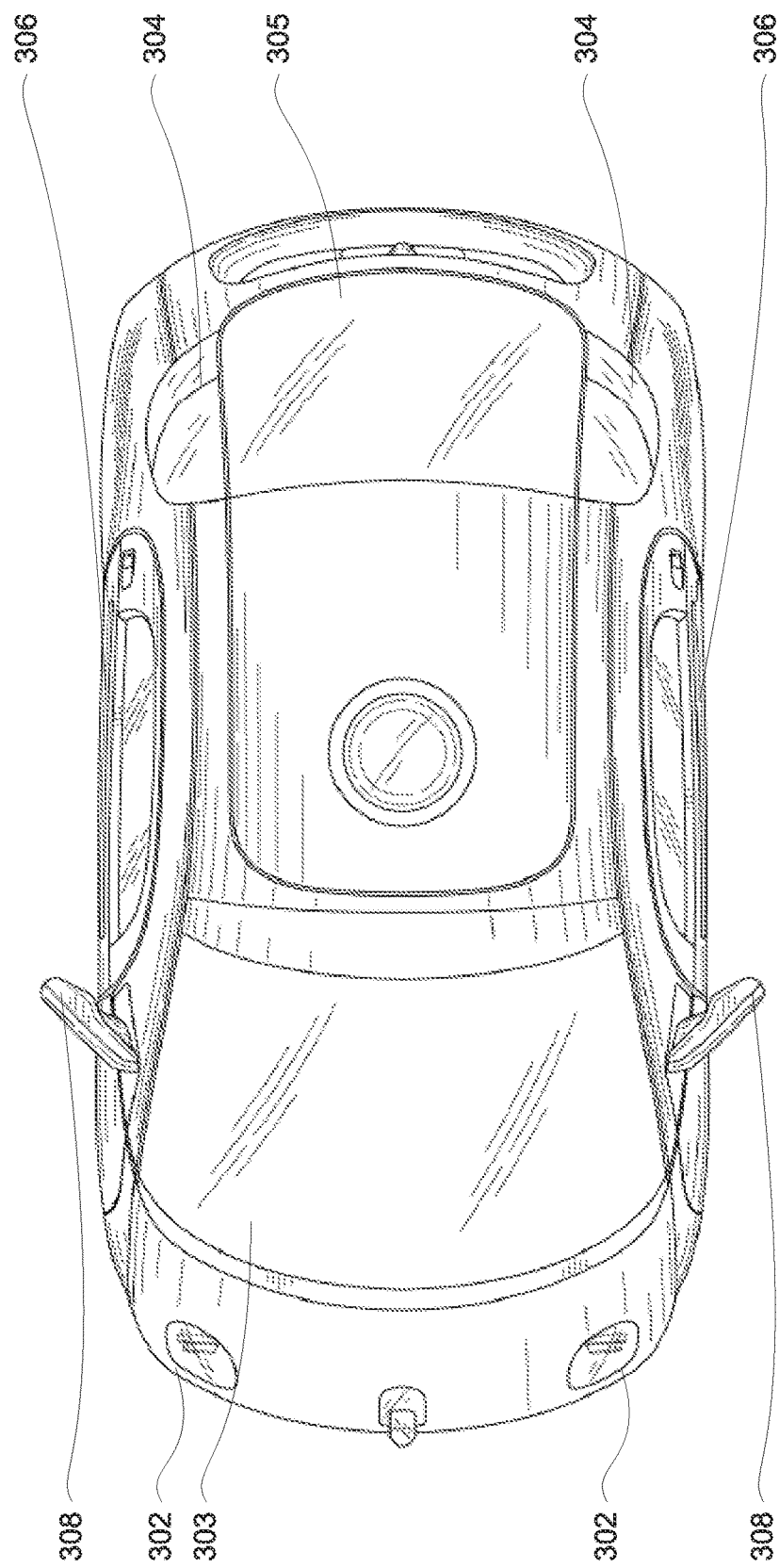

FIGS. 2A and 2B is an example of map information for a section of roadway including intersections 220, 222, 224. FIG. 2A depicts a portion of the map information that includes information identifying the shape, location, and other characteristics of lane marks or lane lines 210, 212, 214, traffic signals 230, 232, 234 (not depicted in the other figures for clarity and simplicity), stop sign 240 (not depicted in the other figures for clarity and simplicity), as well as stop lines 250, 252, 254. In addition to these features, the map information may also include information that identifies lanes defined by the lane lines as well as the direction of traffic for each lane as well as information that allows the computing devices 110 to determine whether the vehicle has the right of way to complete a particular maneuver (i.e. complete a turn or cross a lane of traffic or intersection).

In addition to the feature information, the map information may include a series of road or lane segments. Each lane segment is defined by a starting point, an ending point, and an identifier. For instance, FIG. 2B depicts most of the information of FIG. 2A with the addition of a plurality of lane segments, including for example, lane segments 270, 272, 274. Of course, though many lane segments are depicted, only a few are referenced for clarity and simplicity. FIG. 2B depicts these starting and ending points as open circles, such as open circles 260, 262, 264, 266. Of course, though many open circles are depicted, each representing a starting and ending point, only a few are referenced for clarity and simplicity. As can be seen, circle 260 represents a starting point for lane segment 270, and circle 262 represents an ending point for segment 270. Similarly, circle 262 represents a starting point for lane segment 272, and circle 264 represents an ending point for lane segment 272. In addition, circle 264 represents a starting point for lane segment 274, and circle 266 represents an ending point for lane segment 274. Although not shown, each of these lane segments may be associated with an identifier, for instance, a numeric value corresponding to a relative or actual location of the lane segment.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include sensors such as LIDAR (lasers), sonar, radar, cameras and/or any other detection devices that record data which may be processed by computing devices 110. In the case where the vehicle is a small passenger vehicle such as a car, the car may include a laser or other sensors mounted on the roof or other convenient location. For instance, a vehicle's perception system may use the various sensors to detect objects and their characteristics such as location, orientation, size, shape, type, direction and speed of movement, etc. The raw data from the sensors and/or the aforementioned characteristics can be quantified or arranged into a descriptive function or vector for processing by the computing devices 110. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated with the signaling system 166. Light bar 307 may also be associated with the signaling system 166.

Vehicle 100 also includes sensors of the perception system 172. For example, housing 314 may include one or more laser devices having 360 degree or narrower fields of view and one or more camera devices. Housings 316 and 318 may include, for example, one or more radar and/or sonar devices. The devices of the perception system 172 may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the computing devices 110.

The computing devices 110 may control the direction and speed of the vehicle by controlling various components. By way of example, computing devices 110 may navigate the vehicle to a destination location completely autonomously using data from the detailed map information, perception system 172, and routing system 168. In order to maneuver the vehicle, computing devices 110 may cause the vehicle to accelerate (e.g., by increasing fuel or other energy provided to the power system 174 or engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
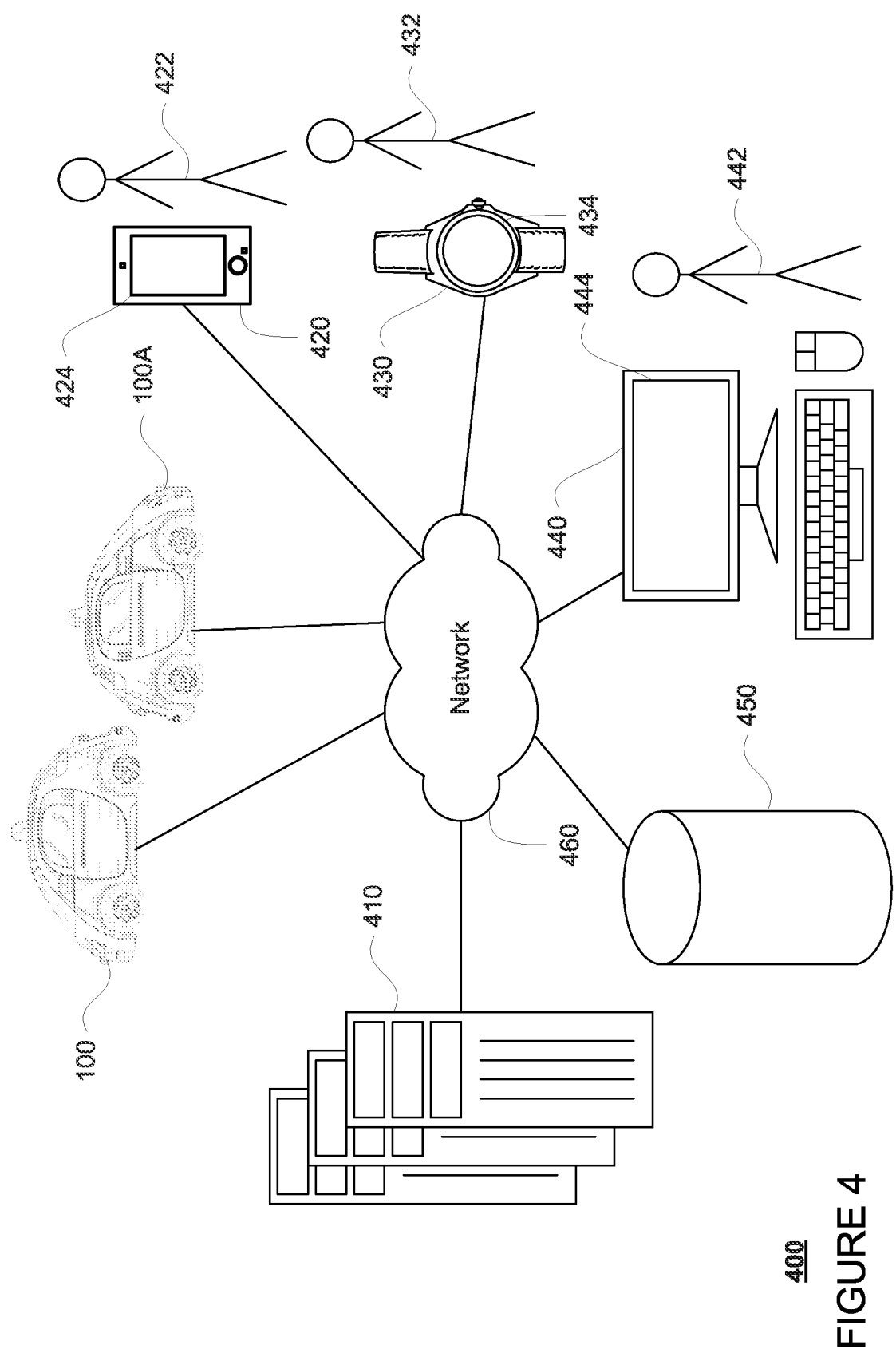
FIG. 4 is a pictorial diagram of a system in accordance with aspects of the disclosure.
Figure 5:
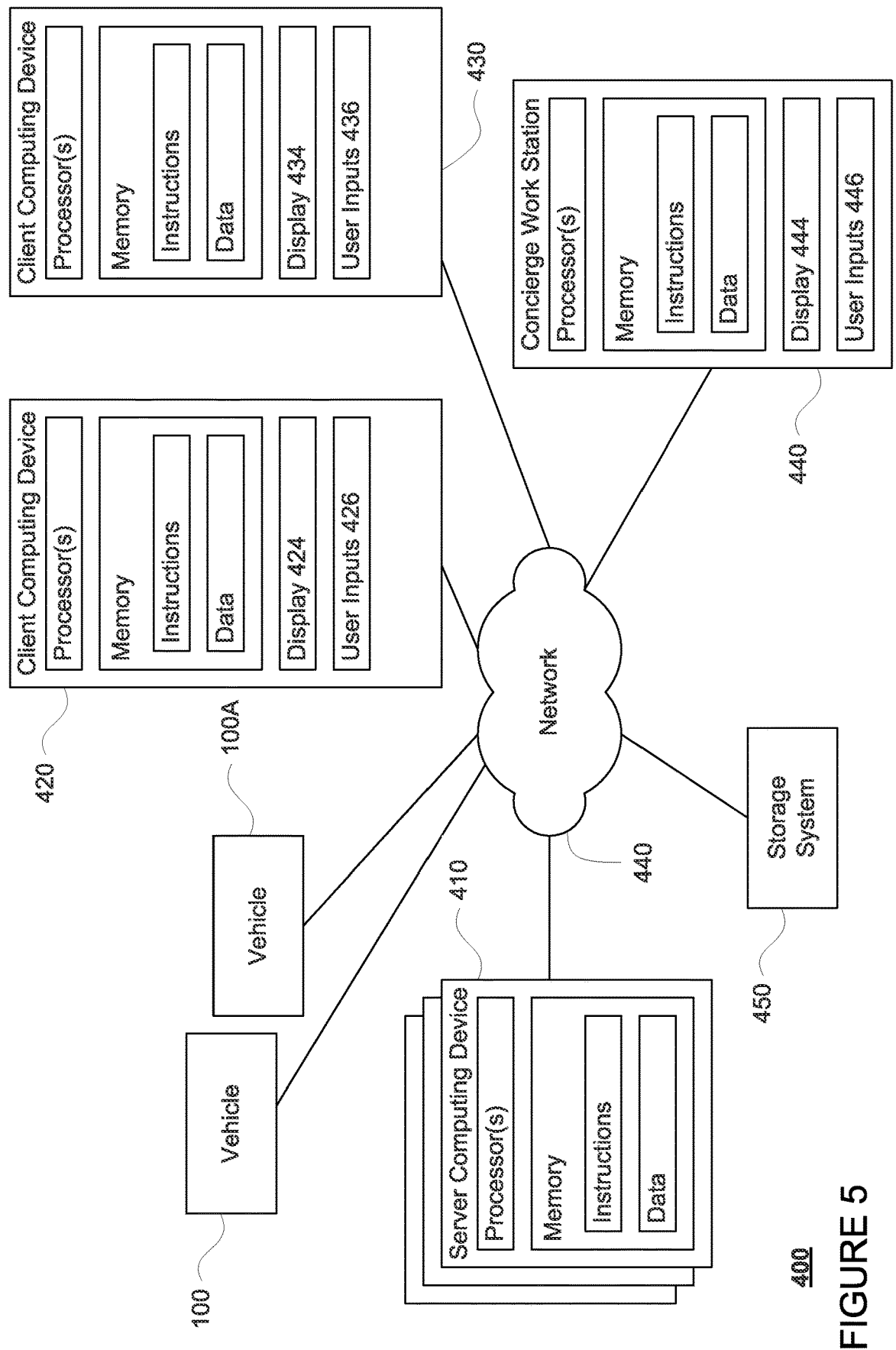
FIG. 5 is a functional diagram of the system of FIG. 4 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information, including the notifications discussed below, to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server (and/or service computing devices) over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be a concierge work station used by an administrator to provide concierge services to users such as users 422 and 432. For example, user 442 may be a concierge that uses concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information. This information may be retrieved or otherwise accessed by a server computing devices, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices s. The user account information may also include personal information such as the user's name, contact information, identifying information of the user's client computing device (or devices if multiple devices are used with the same user account), as well as one or more unique signals for the user.

Storage system 450 may also store shared user information with the system. For example, the user may opt to share certain information about the user with the application, such as his or her work or social schedule, access to personal email accounts or calendar information (including any calendar entries and details, such as dates times, locations, and other content of those entries), and/or real time location information. This information may be sent to the server computing device for processing. In addition, the server computing device may store information about a user's ride history provided by one or more vehicles in which the user has taken a trip. This ride history may include pick up and drop off locations, time of day, day of the week etc.

In addition, the server computing devices may process the shared user information in order to generate task metrics for the user. As discussed in further detail below, task metrics may define tasks that the user is likely to perform or locations to which the user will or has gone.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may use the application to provide different types of information to the server computing devices. For instance, as noted above, the user may opt to share certain user information about the user with the application, such as his or her work or social schedule, access to personal email accounts or calendars, and/or real time location information. The applicant may then periodically, or upon a specific request from the user, provide the shared user information to the server computing devices 410 for processing and/or storage, for instance, in storage system 450.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computing devices 110 may initiate the necessary systems to control the vehicle autonomously along a route to the destination location. For instance, the routing system 168 may use the map information of data 134 to determine a path or route to the destination location that follows a set of the lane segments of map information. The computing devices 110 may then maneuver the vehicle autonomously (or in an autonomous driving mode) as described above along the route towards the destination.

The computing devices 110 may also report information about the trip to the server computing devices 410. For instance, the computing devices 110 may provide information identifying the actual pick up location, date and time, as well as the final destination (i.e. drop off location for the trip), date and time. The server computing devices may then store this information as ride history for a particular user as noted above.

In addition, the server computing devices may process the shared user information and ride history in order to generate task metrics for the user. Task metrics may define tasks that the user is likely to perform or locations to which the user will or has gone. As noted above, these task metrics may be stored in storage system 450. As an example, a calendar entry regarding a restaurant or an email confirming a restaurant reservation may be used to generate a task metric indicating that the user is likely to perform the task of going to that restaurant at the time specified in the calendar entry or email confirmation. Similarly, calendar entries or email confirmations for flights to specific locations may be used to generate a task metric indicating that the user is likely to perform the task of going to a particular airport at a particular time (i.e. 1.5 hours or 2 hours before flight time designated in the calendar entry or email confirmation). In other examples, calendar entries or email confirmations for event tickets (sports, music, theatrical, etc.), hotel reservations, meetings, medical or other appointments, may be used to generate task metrics for a user.

In yet another example, a task metric may identify a location to which the user frequently travels, for instance based on the user's ride history and/or information provided directly by the user, such as the location of the user's home, workplace, favorite restaurant or coffee shop, etc. In such examples, the task metric may identify the location and a time or range of times when the user typically has gone to the location. As an example, a task metric for user 422 may indicate that the user frequently visits a particular restaurant, "Restaurant A," on Friday evenings at 8 pm.

The task metrics and current location information for users may be used to identify users who are likely to use the service for a trip. For instance, if a user has typically used the service for trips to an airport and there is a task metric for the user indicating that the user is likely to go to that airport in the near future, this user is likely to want to use the service to take the user to the airport. Similarly, even if the user has not used the service to take such trips in the past, the task metric in combination with the user's current location may be sufficient to identify the user as someone who is likely to use the service for that particular trip.

In addition to information about users, the server computing devices may have real time information about the location and status of vehicles within the fleet of vehicles. For instance, many vehicles may be located in a given area, but only some of those vehicles may be empty and not already dispatched or otherwise assigned to pick up a particular user.

Figure 6:
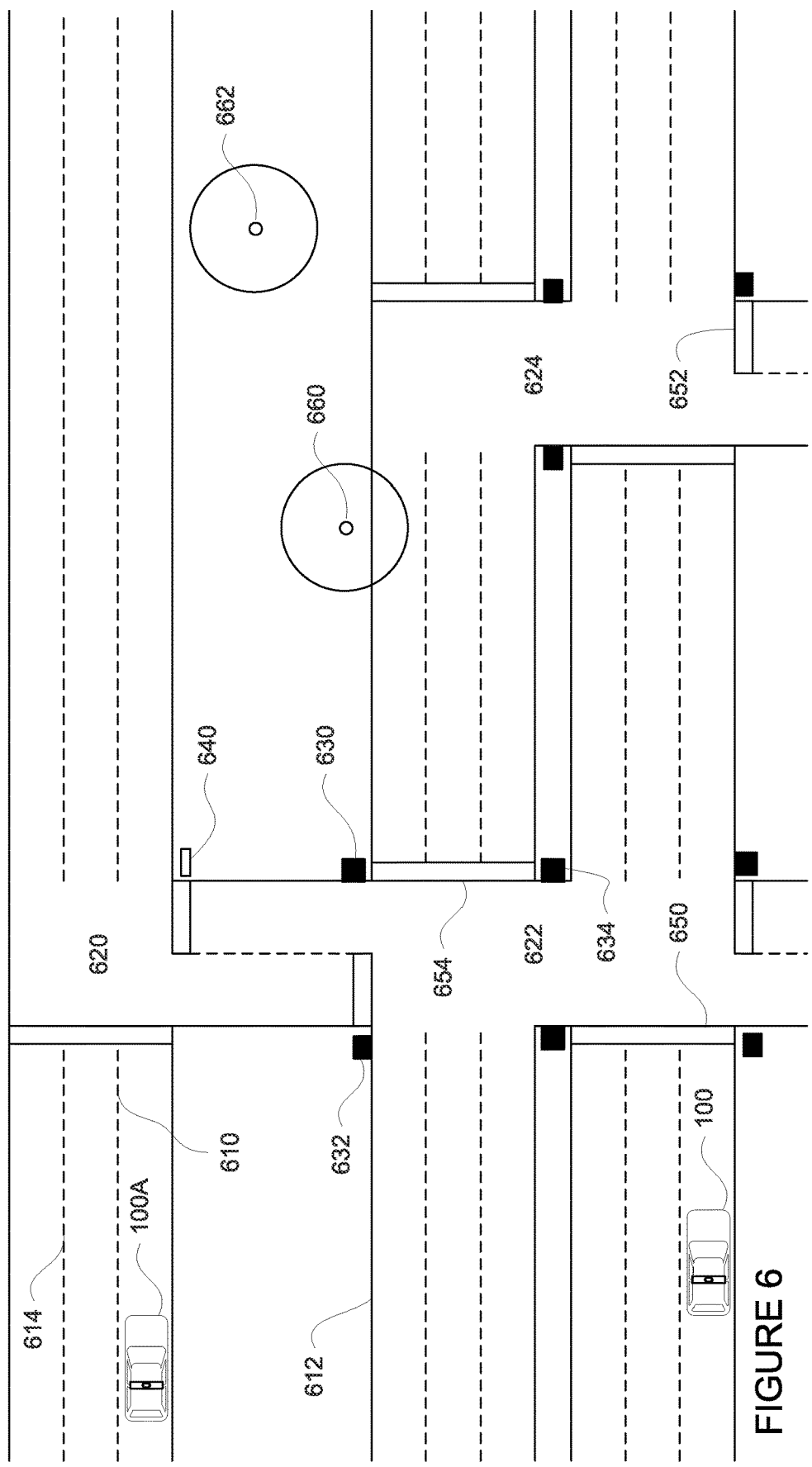
FIG. 6 is a view of a section of roadway in accordance with aspects of the disclosure.

FIG. 6 is an example view of a section of roadway corresponding to the section of roadway defined in the map information of FIGS. 2A and 2B. For instance, FIG. 6 depicts intersections 620, 622, 624 that correspond to intersections 220, 222, 224. In addition the shape, location, and other characteristics of lane lines 610, 612, and 614 correspond to the shape, location and other characteristics of lane lines 210, 212, 214. Similarly, traffic signals 630, 632, 634 (not depicted in the other figures for clarity and simplicity) correspond to traffic signals 230, 232, 234, stop sign 640 (not depicted in the other figures for clarity and simplicity) corresponds to stop sign 240, and stop lines 650, 652, 654 correspond to stop lines 250, 252, 254. FIG. 6 also depicts the locations 660, 662 of users 432, 422 respectively shared by the users via the applications of devices 420 and 430 and received by the server computing devices. Each location is represented by a point and a bubble indicating the accuracy of the location received by the server computing devices. FIG. 6 also depicts the locations of vehicles 100 and 100A received by the server computing devices.

By combining the locations of vehicles with the locations of users and the users' task metrics, the server computing devices 410 can determine whether there is a vehicle currently located within a predetermined distance (i.e. within 5 minutes or 1 mile) of a user who is likely to need or want to take a ride or rather is associated with a task metric which indicates that the user is likely to want to take a trip in the near future (i.e within the next hour or more or less). Thus, to identify a specific vehicle and user combination, the server computing device may first identify any currently available vehicles or vehicles that are going to become available in the near future. For example, returning to FIG. 6, vehicle 100A may currently be occupied and traveling to a destination. However, vehicle 100 may be available, or that is not currently dispatched to pick up a user, taking a user to a destination, or otherwise engaged. In that regard, the server computing devices may identify vehicle 100 as currently available.

In addition, if a vehicle will be finishing a trip, the server computing devices may be able to estimate when a vehicle will be coming available within a predetermined expected period of time. Thus, such a vehicle, even though it is currently providing services for another user, may be identified as an available vehicle within the predetermined expected period of time into the near future, such as 5 minutes or more or less, taking into consideration the amount of time the vehicle will need to complete its current services and allow the other user to exit safely. In this regard, even when stopped to drop off a passenger, a vehicle may not necessarily be available for another minute or more or less. For instance, vehicle 100A may be currently transporting a passenger on a trip, but the server computing devices may identify vehicle 100A as available where the trip is going to end shortly, i.e. within the next 10 minutes or more or less.

Then, using the location information shared by users, server computing devices may then identify a set of any users within a predetermined distance (in space or time) of vehicle 100. In that regard, one or both of users 422 and 432 may be within 0.5 miles of the current location of vehicle 100 or 5 minutes traveling time by vehicle 100.

Of the identified set of users, the server computing devices may then select one or more of those that are associated with task metrics that indicate that these users are likely to accept a trip in response to a notification. For instance, where the user 422 may be a with task metric that indicates that the user frequently visits "Restaurant A" on Friday evenings at 8 pm, the restaurant is less than 30 minutes away via a trip in vehicle 100 (or similar), and it is currently 7:30 pm on a Friday, user 422 may be selected as a user who is likely to accept a trip.

A notification may then be generated for the identified one or more users indicating that a vehicle is available for a trip. For instance, based on the identification of vehicle 100 as available and user 422 selected as likely to accept a trip, a notification may be generated to indicate to user 422 that a vehicle is available.

However, prior to sending a notification, the server computing devices can first send an instruction to dispatch the identified available vehicle to the location of the user or to continue to wait at its current location, for instance, if the vehicle is parked at a location proximate (i.e. within a few hundred feet or more or less) of the user's current location. In this way, the notification is provided only when the vehicle is on its way to the location of the user or has already reached the location of the user. For instance, once the server computing devices has identified a user and a vehicle, without receiving a specific request for the vehicle, the vehicle may show up at or near a particular user's current location. In this way, the notification itself can inform the user that a vehicle is on the way or at the location of the user.

Figures 7C, 7D:
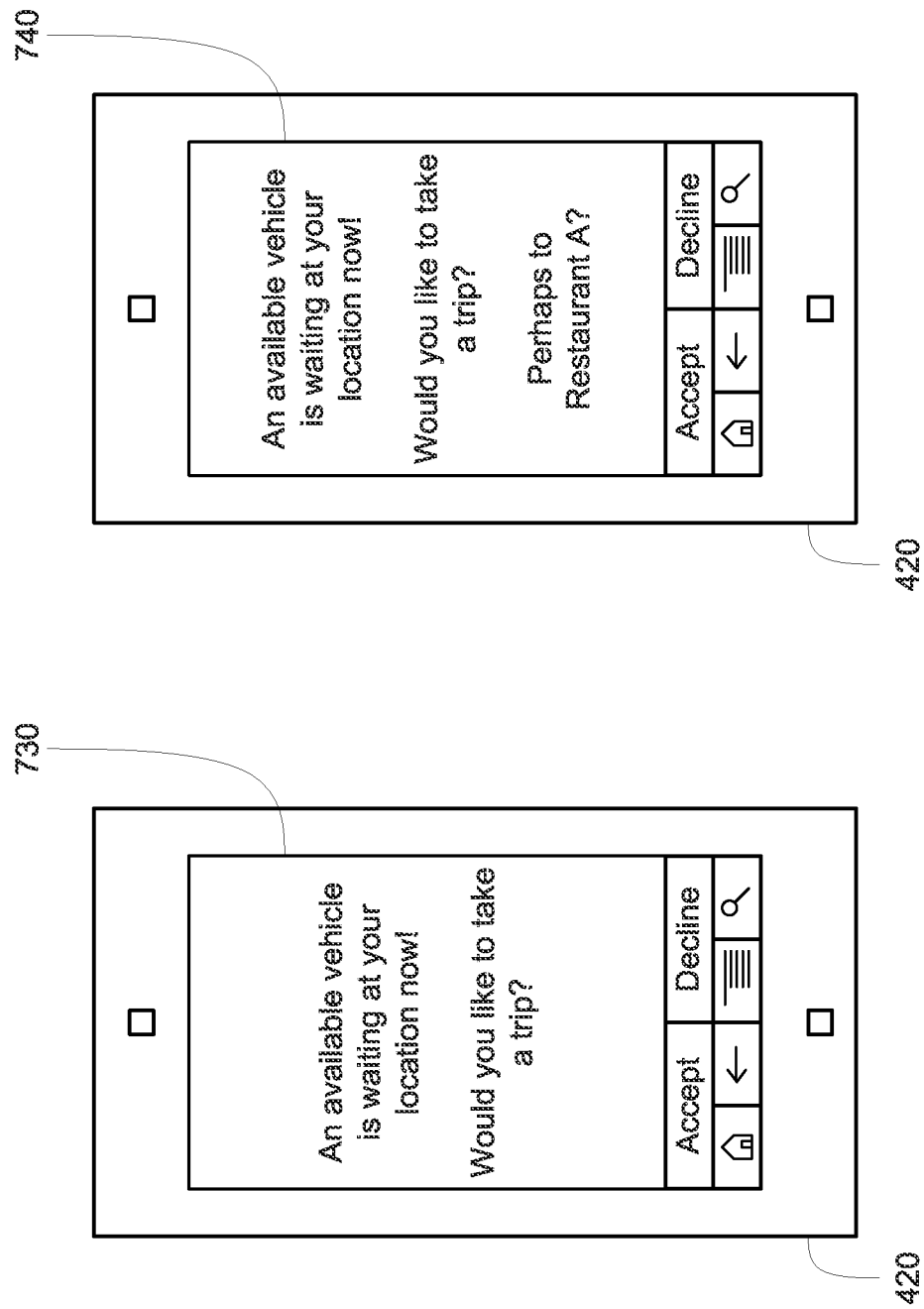

Once a user and vehicle are identified, the server computing devices can send a notification to the user's device for display to the user. As noted above, the server computing devices computing devices may generate a notification to be provided to the user to indicate that a vehicle is currently available for a trip. After dispatching the vehicle or instructing the vehicle to wait at its current location, the notification may be sent to the user. Once received by the user's client computing device, an audible tone or tactile indication may be provide to indicate that a notification has been received. The user may then select to view or hear the notification. In this regard, the notification may be visual notification which simply displays on the display of the user's client computing device as shown in FIGS. 7A-7D and/or an audible notification that speaks the information. For example, FIG. 7A depicts a notification 710 indicating to user 422 that a vehicle is currently available. In addition, the notification may or may not include information about how far the vehicle currently is from the user or an estimate time of arrival as shown in notification 720 of FIG. 7B or whether the vehicle is already parked nearby waiting for the user as in notification 730 of FIG. 7C. As noted above, the server computing devices 410 can send the notification and any additional information to the identified user's client device via network 460.

In addition to indicating that the vehicle is available to pick up the user for a ride, the notification may also make a suggestion about a destination. This suggestion may be generated based on the user's pattern of ride behavior or any task metric or metrics used to identify the user. Returning to the example above, once the vehicle his on its way to the location of the user (or has reached the location of the user), the user may receive a notification that "suggests" a trip to a restaurant based on the user 422's history of going to that restaurant at Friday evenings at 8 pm as shown by notification 740 suggesting a trip to "Restaurant A" shown in of FIG. 7D.

The timing of the notification may be based on the location of the user, how long it will take to reach the suggested location (for instance due to current or predicted traffic conditions), any date and/or time of any task metric used to identify the user, how long it will take an available identified vehicle to reach the user, etc. If the current location of the user is approximately 30 minutes from the restaurant (via being transported by the vehicle) and an available identified vehicle is only 2 minutes from picking up the user, the server computing devices may send the notification at least 32 minutes before 8 pm on a Friday evening suggesting that the user take a trip to the restaurant.

In addition, the server computing devices may even provide the user's client device with instructions to provide and/or display the notification at that or some other particular time. For instance, where the vehicle is more than 5 minutes from the location of the user, the server computing device may wait to send the notification to the user's client device until the vehicle is closer to the location of the user or send the notification with instructions to delay displaying or otherwise providing the notification to the user. In another example, where a task metric indicates that a user travels to his or her workplace at 8:30 am, but at 8:00 am the server computing devices estimates that it will take a vehicle 45 minutes to reach the work place at 8:30 due to traffic conditions, the server computing devices may send a notification that suggests a trip the user's workplace immediately, rather than waiting closer to 8:30 to prevent the user from being late to the user's workplace.

A user may accept the notification, or rather the offer for a ride in the notification. The acceptance may be provided to the server computing device. At that point, the server computing device may provide the user's client computing device with further information regarding the current location of the vehicle and whether it is stopped and already waiting for the user. All of some of this information may be displayed and or played to the user (if an audible message) based upon the user's notification preferences.

At the same time, the server computing devices may send the identified vehicle updated dispatch information. For instance, this may include information identifying the user, for instance to facilitate authentication of the user's client computing device prior to the trip, and/or final dispatch instructions to allow the vehicle to actually reach an updated location of the user (i.e. a location provided after the notification was generated). In response, the vehicle's one or more computing devices 110 may maneuver the vehicle to the pickup location using the various features described above or continue to wait for the user in its current location, for instance, if the vehicle is already parked within a predetermined distance, such as 30 meters or more or less, of the user's updated location.

As the vehicle approaches the user's client device (or vice versa), the vehicle's computing devices may authenticate the user's client device and also the user. When the user is authenticated, the vehicle's computing devices may automatically unlock the vehicle's doors and allow the user to enter the vehicle. The vehicle's one or more computing devices 110 may also display a welcome screen on the internal electronic display 152. This welcome screen may provide instructions to the user (now a passenger) on how to use the vehicle. For example, the instructions may include requesting that the passenger shut the doors 306 if needed and buckle his or her seatbelt. Sensors associated with the seats, doors, and seatbelts may be used to determine if the passenger has complied. Once the passenger has complied with the instructions, he or she may press or otherwise activate a button of the vehicle that will activate the autonomous driving mode. In response, the computing devices 110 may initiate the necessary systems to control the vehicle autonomously along a route to the destination location.

Once the user, now passenger, is safely in the vehicle, the computing devices 110 may initiate the necessary systems to control the vehicle autonomously along a route to the destination location. For instance, the routing system 168 may use the map information of data 134 to determine a path or route to the destination location that follows a set of the lane segments of map information. The computing devices 110 may then maneuver the vehicle autonomously (or in an autonomous driving mode) as described above along the route towards the destination.

Where appropriate, the notification may be sent to a different user (i.e. a user other than the identified user) or even multiple users. For instance, if an identified user's account is associated with another person, such as a parent or guardian, the notification may be sent to one or both of the user and the other person. This may be especially useful for persons who need to order a vehicle for an elderly or disabled user for instance, to transport the user to a medical or other appointment.

In another example, if two or more users are located at or near the same location and would likely need or want a ride according to their respective task metrics, both of these users may receive the notification. At the same time, the vehicle may be dispatched to the location of a user more likely to accept a ride (according to task metrics, their pattern of ride behavior, acceptance of such notifications in the past, etc.), the location of the user that is closest to the location of the vehicle at the time of dispatch, or a location between the users. Returning to the example of FIG. 6, where user 432 is associated with a task metric that indicates that user 432 typically leaves a work location at 7:30 pm on Friday evenings, both user 432 and user 422 may be selected as likely to accept a trip. However, if only 1 vehicle (here vehicle 100) is available, vehicle 100 may be dispatched to user 422 who may have a history of accepting trips more often than user 432, or to user 432 where user 432 often uses the vehicle services to travel from work to home on Friday evenings (as indicated by user 432's task metrics).

Alternatively, the vehicle may be dispatched to a certain location proximate to a number of users who, based on task metrics, are likely to go to or need transportation to a particular popular location, such as a train station or metropolitan area at commuting times. A notification may go out to all users within a short distance, such as half a mile or more or less) indicating that the vehicle is available to transport users to the popular location. In addition, the notification may indicate that multiple seats are available, including in some cases, exactly how many seats are available. In addition, the notification may indicate that the users who accept first will be provided with a seat. Thus, once the number users who have accepted corresponds to the number of available seats, a second notification may be sent to the user's client devices indicating that the trip is now closed as no more seats are available. To encourage such acceptance, users may even be offered discounted fares or coupons.

The notifications themselves may also include suggestions for free or discounted rides to locations where the vehicle will be needed once the vehicle has taken the user to that location. Such trips can even be sponsored by an advertiser. In addition or alternatively, the notifications may notify the user of times when certain rides are at low prices, trips would be fastest (e.g. based on traffic conditions), or simply that the vehicle is available for use at a time that is proximate to the potential passenger's typical commute time (determined from the user's pattern of ride behavior).

Once a user has accepted a ride, further notifications can be provided to indicate the status of the vehicle to the user. For instance, this may include information about where the vehicle is, how far away the vehicle is in distance or time, and/or whether the vehicle is already parked and waiting for the user. In addition, if there is an issue with the vehicle reaching the user, for instance, because a vehicle will take longer to reach the user, for instance 10 minutes instead of 2 as originally promised to the user, the user's client device may be provided with a notification indicating such as well as providing a discount on the ride or a coupon for other goods or services available to the user within a short distance of his or her current location. For instance, a notification may include the text "Your vehicle is running a bit behind. We are sorry for the inconvenience, but please enjoy this $2 coupon for the coffee shop one block down the street. Your vehicle will pick you up right in front of it in 10 minutes."

Such suggestions may be even be made during a trip to encourage use of the services. As another example, during a trip, an advertisement may offer a coupon for a discount on goods or services at a particular location, such as "save $1 when you stop at a coffee shop that the vehicle will pass in 3 minutes". If the passenger wants to accept the offer, in some examples, such as where the offer is made before the trip, the goods or services can be ready and waiting for a user when the vehicle arrives to pick up the user or waiting at the destination when the user arrives at the destination. As another example, an advertisement may suggest a particular destination, such as to indicate a happy hour beginning at a nearby bar.

In some instances, the suggested destinations may even be sponsored. For example, an advertiser may offset the cost of a reduced or discounted fare to a place of business associated with the advertiser (i.e. a restaurant owner or representative of the restaurant where the place of business is the restaurant) when a user accepts a notification suggesting a ride to the place of business. Where the user has not previously visited the place of business, but has used the vehicle services, this may help the advertiser to identify new customers or clients.

To reduce processing at the server computing devices, the task metrics may be prioritized based on current location information for a user, available vehicles, timing to reach a given user, and even the user's ride history. In other words, if no vehicles are currently available or likely to be available within a 5 minutes distance of a current location of a user, that user's task metrics may be given a low priority. At the same time, if such a user utilizes the services often based on his or her ride history, that same user's task metrics may be given higher priority. Higher priority task metrics may be used to identify users likely to take rides and thus to select users as well as to identify to which users to dispatch a vehicle (where there are multiple notifications sent).

Figure 8:
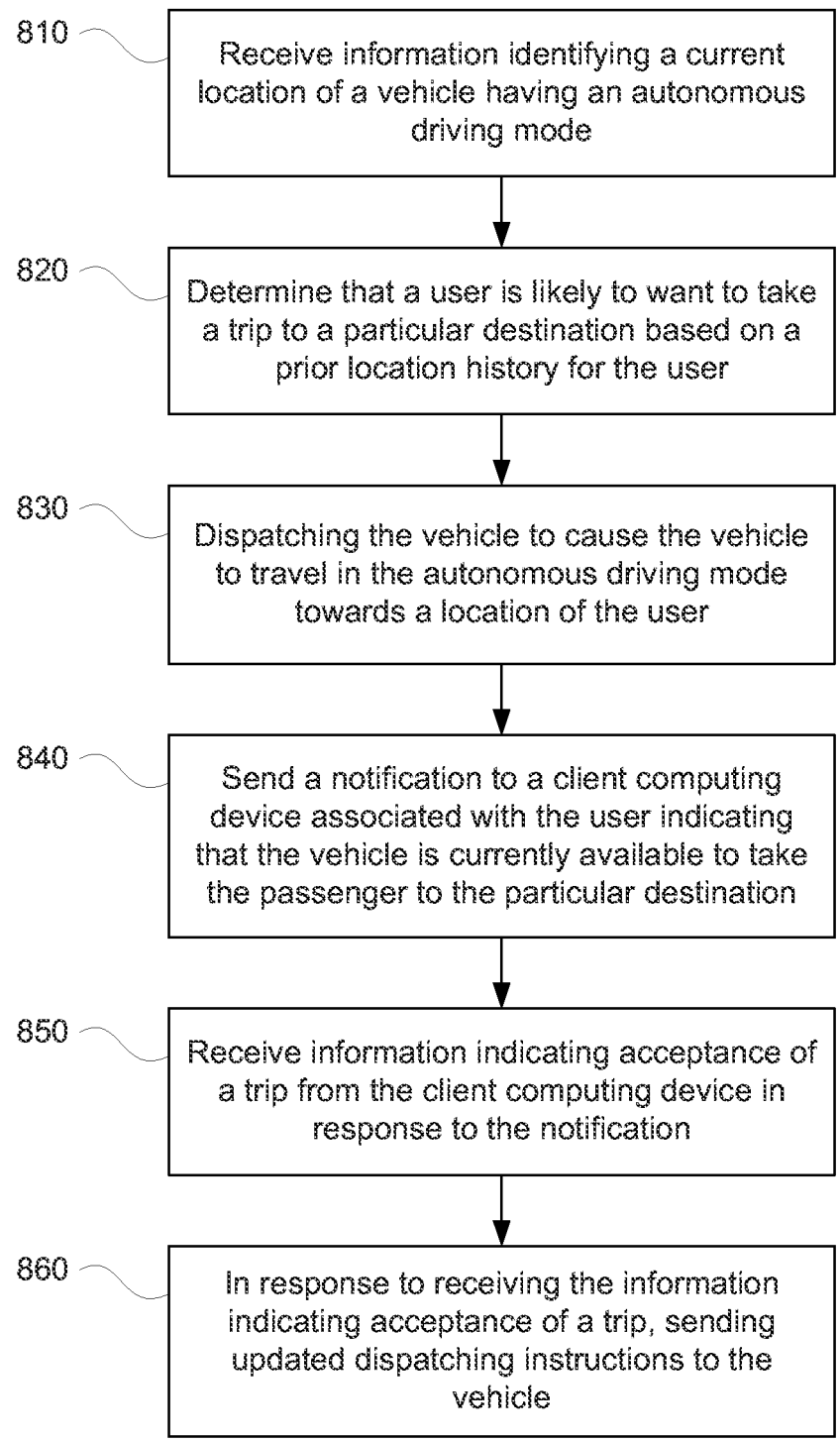
FIG. 8 is a flow diagram in accordance with aspects of the disclosure.

FIG. 8 is an example flow diagram 800 in accordance which may be performed by one or more server computing devices having one or more processors, such as server computing devices 410 in order to facilitate transportation services between a user, such as users 422 or 432, and a vehicle having an autonomous driving mode, such as vehicles 100 or 100A. In this regard, block 810 includes receiving information identifying the current location of the vehicle. At block 820, that the user is likely to want to take a trip to a particular destination is determined based on prior location history for the user. Thereafter, the vehicle is dispatched to cause the vehicle to travel in the autonomous driving mode towards a location of the user at block 830. A notification is sent to a client computing device associated with the user indicating that the vehicle is currently available to take the passenger to the particular destination at block 840. Information indicating acceptance of a trip is received from the client computing device in response to the notification at block 850. In response to receiving the information indicating acceptance of a trip, updated dispatching instructions are sent to the vehicle to the vehicle at block 860.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of offering a potential passenger a service provided by a vehicle operating in an autonomous driving mode, the method comprising:

determining, by one or more processors, a first amount of time it will take the vehicle to travel from a current location of the vehicle to a current location of the potential passenger;

determining, by the one or more processors, a second amount of time it will take the vehicle to travel from the current location of the potential passenger to a destination location to which the potential passenger is likely to want to take a trip;

estimating, by the one or more processors, a time of arrival (TOA) for the vehicle at the destination location based on the first amount of time and the second amount of time;

sending, by the one or more processors to a client device associated with the potential passenger, a notification at a time based on the estimated TOA, the notification including an offer of the service to the potential passenger;

receiving, by the one or more processors from the client device, a response to the notification indicating that the potential passenger accepts the offer of the service; and sending, by the one or more processors, dispatching instructions to the vehicle to cause the vehicle to maneuver from the current location of the vehicle to the current location of the potential passenger while operating in the autonomous driving mode.

2. The method of claim 1, wherein the service includes picking up the potential passenger at or near the current location of the potential passenger and taking the potential passenger on the trip to the destination location.

3. The method of claim 1, wherein the sending of the dispatching instructions is performed before the sending of the notification is performed.

4. The method of claim 3, further comprising:
calculating, by the one or more processors, a total amount of travel time based on the first amount of time and the second amount of time, wherein the sending of the notification is performed at a time that is at least the total amount of travel time before the estimated TOA.

5. The method of claim 3, wherein the time at which the notification is sent is delayed until after the first amount of time is shorter than a predetermined amount of time.

6. The method of claim 1, wherein the notification includes instructions to display the offer of the service to the potential passenger on a display of the client device.

7. The method of claim 6, wherein the instructions indicate whether the offer of the service should be immediately displayed on the display or the offer of the service should be displayed on the display after waiting a predetermined amount of time.

8. The method of claim 1, wherein the notification is sent to multiple client devices including the client device associated with the potential passenger.

9. The method of claim 1, further comprising:
storing, by the one or more processors in one or more storage devices, information about the potential passenger including one or more of a work schedule, a social schedule, personal email accounts, calendar information, location information or ride history.

10. The method of claim 9, wherein the ride history includes at least one of pick up and drop off locations, time of day or day of week.

11. A system for offering a potential passenger a service provided by a vehicle operating in an autonomous driving mode, the system comprising:
one or more storage devices; and
one or more processors coupled with the one or more storage devices, the one or more processors being configured to:
determine a first amount of time it will take the vehicle to travel from a current location of the vehicle to a current location of the potential passenger;
determine a second amount of time it will take the vehicle to travel from the current location of the potential passenger to a destination location to which the potential passenger is likely to want to take a trip;
estimate a time of arrival (TOA) for the vehicle at the destination location based on the first amount of time and the second amount of time;
send, to a client device associated with the potential passenger, a notification at a time based on the estimated TOA, the notification including an offer of the service to the potential passenger;
receive, from the client device, a response to the notification indicating whether the potential passenger accepts the offer of the service; and
send dispatching instructions to the vehicle to cause the vehicle to maneuver from the current location of the vehicle to the current location of the potential passenger while operating in the autonomous driving mode.

12. The system of claim 11, wherein the service includes picking up the potential passenger at or near the current location of the potential passenger and taking the potential passenger on the trip to the destination location.

13. The system of claim 11, wherein the dispatching instructions are sent before the notification is sent.

14. The system of claim 13, wherein the time at which the notification is sent is delayed until after the first amount of time is shorter than a predetermined threshold.

15. The system of claim 11, wherein the notification includes instructions to display the offer of the service to the potential passenger on a display of the client device.

16. The system of claim 15, wherein the instructions indicate whether the offer of the service should be immediately displayed on the display to the potential passenger or the offer of the service should be displayed on the display after waiting a predetermined amount of time.

17. The system of claim 11, wherein the notification is sent to multiple client devices including the client device associated with the potential passenger.

18. The system of claim 11, wherein the one or more processors are configured to store, in the one or more storage devices, information about the potential passenger including one or more of a work schedule, a social schedule, personal email accounts, calendar information, location information or ride history.

19. The system of claim 18, wherein the ride history includes at least one of pick up and drop off locations, time of day or day of week.

* * * * *